(12) United States Patent
Onodaka et al.

(10) Patent No.: US 6,259,437 B1
(45) Date of Patent: Jul. 10, 2001

(54) DISPLAY-INTEGRATED TABLET DEVICE

(75) Inventors: Koji Onodaka; Katsuya Hiraga; Yoichi Kobori; Satoshi Nagasawa, all of Mobara (JP)

(73) Assignee: Futaba Denshi Kogyo K.K., Mobara (JP)

( * ) Notice: Subject to any disclaimer, the term of this patent is extended or adjusted under 35 U.S.C. 154(b) by 0 days.

(21) Appl. No.: 08/999,955

(22) Filed: Aug. 31, 1994

(30) Foreign Application Priority Data

Aug. 31, 1993 (JP) .................................................. 5-237166

(51) Int. Cl.[7] .................................................. G09G 5/00
(52) U.S. Cl. .......................... 345/174; 345/173; 178/18.1
(58) Field of Search ..................................... 345/173, 174, 345/104, 76, 60; 78/18.1, 18.01, 18.05, 18.06

(56) References Cited

U.S. PATENT DOCUMENTS

| | | | |
|---|---|---|---|
| 4,893,115 | * | 1/1990 | Blanchard ............................ 345/174 |
| 5,418,551 | * | 5/1995 | Ise ........................................ 345/174 |
| 5,625,382 | * | 4/1997 | Ebihara et al. ...................... 345/173 |

* cited by examiner

Primary Examiner—Kent Chang
(74) Attorney, Agent, or Firm—Oblon, Spivak, McClelland, Maier & Neustadt, P.C.

(57) ABSTRACT

A display-integrated tablet device capable of improving luminance of an image displayed while carrying out coordinate detection plural times during a one-image-plane display period. X-coordinate detection is carried out in a manner to take, in an X-coordinate detection section, a voltage obtained by feeding each of second gate electrodes with a pulse generated in a pen-pulse generation circuit. Y-coordinate detection is carried out by inputting a voltage obtained by outputting of a pulse for scanning Y-electrodes (lines) from a stylus pen to a Y-coordinate peak detection circuit. After coordinate detection is thus executed, only Y-electrodes in a predetermined range about a Y-coordinate previously detected are scanned in a Y-coordinate detection period provided after each of block display periods defined by dividing an image display period.

6 Claims, 13 Drawing Sheets

PEN INPUT POSITION

DISPLAY-INTEGRATED TABLET DEVICE

BACKGROUND OF THE INVENTION

This invention relates to a display-integrated tablet device, and more particularly to a device in which a display and a tablet capable of carrying out coordinate input are integrated with each other.

A conventional display-integrated tablet device is generally constructed in such a manner as shown In FIG. 11. More specifically, a conventional display-integrated tablet device generally designated by reference numeral 30 in FIG. 11 includes a matrix tablet (hereinafter merely referred to as "tablet") 31 for carrying out display and coordinate detection which comprises a thin film electric luminescence (EL) matrix tablet. The tablet 31 includes X-electrodes $x_1$ to $x_m$ arranged in a column direction for carrying out horizontal scanning and Y-electrodes $y_1$ to $y_n$ arranged in a row direction for carrying out vertical scanning, so that the X-electrodes and Y-electrodes cooperate with each other to form a matrix.

The X-electrodes $x_1$ to $x_m$ each are connected to a X-scanning driver 32, which functions to apply a scan voltage to the X-electrodes $x_1$ to $x_m$ at a predetermined timing according to control by a driver controller 34. The Y-electrodes $y_1$ to $y_n$ are commonly connected to a Y-scan driver 33, which likewise applies a scan voltage to the Y-electrodes $y_1$ to $y_m$ at a predetermined timing according to control by the driver controller 34.

The display-integrated tablet device 30 also includes a CPU 35 for carrying out image display scan control, as well as carrying out detection operation of an input coordinate indicated through a stylus pen 36 based on a peak detection signal at a predetermined timing as described hereinafter.

The stylus pen 36 includes a distal end or pen point for detection, which is adapted to be abutted against the tablet to carry out coordinate detection according to an electrostatic capacity coupling system. Reference numeral 37 designates an amplifier for amplifying a coordinate detection signal output from the stylus pen 36 and 38 is a peak detection section for carrying out peak detection with respect to the coordinate detection signal fed from the stylus pen 36 through the amplifier 37, to thereby feed a coordinate position at which a peak of the signal is detected to the CPU 35.

Now, display operation and coordinate input operation which are carried out by the conventional display-integrated tablet device 30 thus constructed will be described hereinafter with reference to FIGS. 12(a) to 12(l) and FIG. 13.

FIGS. 12(a) to 12(l) each show a waveform of a timing at which scanning of each of the X-electrodes $x_1$ to $x_m$ and Y-electrodes $y_1$ to $y_n$ of the tablet 31 is executed by each of the X-scan driver 32 and Y-scan driver 33. As shown in FIGS. 12(a) to 12(l), supposing that a period during which display for one picture plane is carried out and a period during which a pen input position is detected are defined to be a one-image-plane display period corresponding to one frame or one field period, the period is separated into a display period during which display operation is actually carried out and Y- and X-coordinate detection periods.

During the display period, the Y-scan driver 33 applies a scan voltage to the Y-electrodes $y_1$ to $y_n$ turn as shown in FIGS. 12(a) to 12(c), to thereby execute vertical scanning. More specifically, application of the voltage to the Y-electrodes $y_1$ to $y_n$ is carried out by one line for every one time depending on a vertical/horizontal synchronous signal.

The X-scan driver 32 applies a voltage to the X-electrodes $x_1$ to $x_m$ within a scan period of each of the Y-electrodes $y_1$ to $y_n$ depending on display data fed thereto from the driver controller 34 as shown in FIGS. 12(d) to 12(f). More specifically. the X-scan driver 32 applies the voltage to the X-electrodes corresponding to display cells in the Y-electrodes (horizontal lines) in turn.

Therefore, during scanning of each of the Y-electrodes, a phosphor of each of picture cells intersecting the X-electrodes having a voltage applied thereto is excited for luminescence due to formation of an electric field by the X-electrodes and Y-electrodes, resulting in display operation being carried out.

FIGS. 12(g) to 12(l) each enlargedly show a scan timing of the X-electrodes $x_1$ to $x_m$ while enlarging a scan period of the Y electrodes $y_1$ and $y_2$.

When such a display period terminates, operation for a Y-coordinate detection period takes places. An X-coordinate detection period following the Y-coordinate detection period is defined for detecting coordinate input due to abutment of the stylus pen 36 against the tablet 31.

First, during the Y-coordinate detection period, only the Y-scan driver 33 applies a detection voltage to the Y-electrodes $y_1$ to $y_n$ in turn as shown in FIGS. 12(a) to 12(c). Therefore, when the pen point of the stylus pen 36 is kept abutted against a location on the tablet 31, electrostatic capacity coupling occurs between the Y-electrode positioned in proximity to the location and the stylus pen 36, so that a voltage is output in the form of a coordinate detection signal from the stylus pen 36.

Also, during the X-coordinate detection period, only the X-scan driver 32 applies a detection voltage to the X-electrodes $x_1$ to $x_m$ in turn as shown in FIGS. 12(d) to 12(f). Thus, when the pen point of the stylus pen 36 is kept abutted against a location on the tablet 31, electrostatic capacity coupling occurs between the X-electrode positioned in proximity to the location and the stylus pen 36, resulting in a voltage being output in the form of a coordinate detection signal from the stylus pen 36.

FIG. 13 is a graphical representation showing a voltage distribution due to electrostatic capacity coupling, wherein an abscissa axis indicates a location in an X-direction or a Y-direction and an ordinate axis indicates electrostatic capacity. As shown in FIG. 13, the electrostatic capacity is distributed in the form of a curved shape with respect to a location on the tablet 31 against which the stylus pen 36 is abutted. Therefore, during a period of scanning of an X-electrode (or Y-electrode) adjacent to a certain Y-electrode (or X-electrode), the stylus pen 36 generates a voltage along the curve shown in FIG. 13.

In view of the above, supposing that the coordinate detection signal shown in FIG. 13 is fed from the stylus pen 36 through the amplifier 37 to the peak detection circuit 38, for example, during scanning of a certain Y-electrode, the peak detection circuit 38 detects a peak position of the coordinate detection signal by means of a comparator or the like employing, for example, a voltage as a reference and feeds a peak position signal to the CPU 35 upon the detection.

Then, the CPU 35 discriminates the Y-electrode being scanned during a period corresponding to a timing at which the peak position signal is fed, resulting in the Y-electrode at the location at which the the stylus pen 36 is abutted against the table 31 or the Y-coordinate being discriminated.

This is likewise applied to Y-coordinate detection. More particularly, during the X-coordinate detection period, a scan voltage is applied to the X-electrodes $x_1$ to $x_m$ in turn for detection of an X-coordinate, to thereby obtain such a detection signal as shown in FIG. 13, resulting in a peak position signal of the voltage being fed to the CPU 35.

Thus, detection of a Y-coordinate as an input position is carried out during the Y-coordinate detection period and detection of an X-coordinate as an input position likewise takes place during the X-coordinate detection period, so that inputting of the X-coordinate and Y-coordinate by the stylus pen 36 is carried out.

In the conventional display-integrated tablet device constructed as described above, it is required to carry out both image display and coordinate detection by means of the same tablet, so that the one-image-plane display period is required to be divided into the actual display period and the X-coordinate detection period and Y-coordinate detection period, as shown in FIGS. 12(a) to 12(l).

Also, during the detectl on period, a pulse-like scan voltage of tens to hundreds of volts is applied to the X-electrodes and Y-electrodes in turn, so that the scan pulse is required to have a pulse width as long as several microseconds for every electrode. This causes a period of time required for detection during the one-image-plane display period or a period corresponding to display interruption to be considerably increased, so that the actual display period is reduced correspondingly.

Normally, in such display, the one-image-plane display period is defined to be about 1/60 to 1/70 second (about 16.7 to 14.2 ms). For example, supposing that sixty Y-electrodes and eighty X-electrodes are scanned at a pulse width of 5 us for detection in turn by means of a high speed driver, detection of the X-coordinate and Y-coordinate requires a period as long as (60×5)+(80×5)=700 us (0.7 ms), so that a period of time required for detection of the X-coordinate and Y-coordinate accounts for a considerable percentage of the one-image-plane display period.

Such a decrease in percentage for which the actual display period accounts of the one-image-plane display period exhibits a disadvantage of causing an image displayed to be darkened.

Also, when the stylus pen 36 is used for not pointing but letter or character recognition, it is required that movement of the stylus pen 36 at a suitable speed on the tablet 31 for coordinate detection is carried out at least for every 1/120 second (about 8.3 ms) in view of detection accuracy. Thus, when coordinate detection during the one-image-plane display period takes place, for example, twice or more for the purpose of realizing such a detection speed in the coordinate detection shown in FIGS. 12(a) to 12(l), the display period is decreased because a relationship between the pulse width and the number of electrodes scanned does not permit the coordinate detection period to be decreased, so that the displayed image may be further darkened to a degree sufficient not to be put to practical use.

SUMMARY OF THE INVENTION

The present invention has been made in view of the foregoing disadvantages of the prior art.

Accordingly, it is an object of the present invention to provide a display-integrated tablet device which is capable of increasing an actual display period to improve luminance of an image displayed.

It is another object of the present invention to provide a display-integrated tablet device which is capable of carrying out coordinate detection with increased accuracy.

It is a still further object of the present invention to provide a display-integrated tablet device which is capable of efficiently feeding an X-coordinate detection section with a voltage for detection.

In accordance with the present invention, a display-integrated tablet device is provided. The display-integrated tablet device comprises a tablet including includes a plurality of cathode electrodes arranged in a stripe-like manner and provided thereon with emitters for emitting electrodes therefrom, a plurality of first gate electrodes arranged above the cathode electrodes in a manner to be perpendicular to the cathode electrodes, a plurality of second gate electrodes arranged on the first gate electrodes so as to extend in a direction substantially identical with the first gate electrodes, and anode electrodes each arranged in a manner to be opposite to each of the second gate electrodes and having a phosphor deposited thereon. Also, the device comprises a Y-electrode drive means for scanning at least the cathode electrodes at a predetermined timing, an X-electrode drive means for scanning the first gate electrodes, a conductor for detection changed over between a first state of outputting a signal for detection for coordinate input and a second state for detecting a scan voltage, a first peak detection means connected to the second gate electrode for detecting a peak of the signal for detection output from the conductor for detection in the first state, a second peak detection means for detecting a peak value of the scan voltage output from the conductor for detection in the second state, and an X-Y coordinate detection means for detecting an X-coordinate and a Y-coordinate of the conductor for detection abutted against the tablet from the first and second peak detection means.

In a preferred embodiment of the present invention, in the second state, the conductor for detection is set so as to detect a scan voltage within a predetermined range about a position on the Y-coordinate when at least the Y-coordinate is detected after display of one image plane.

In a preferred embodiment of the present invention, the tablet includes a display plane which is divided into at least two display regions in a direction of the Y-electrodes, wherein the conductor for detection is controlled so as to be changed over to the second state when display of each of the display regions is terminated.

In a preferred embodiment of the present invention, the second gate electrodes each are fed with a driving voltage through a high resistance.

BRIEF DESCRIPTION OF THE PREFERRED EMBODIMENTS

These and other objects and many of the attendant advantages of the present invention will be readily appreciated as the same becomes better understood by reference to the following detailed description when considered in connection with the accompanying drawings; wherein:

FIG. 1 is a block circuit diagram showing an embodiment of a display-integrated tablet device according to the present invention;

FIGS. 2(a) and 2(b) each are a schematic view showing switching of operation of a stylus pen in the display-integrated tablet device of FIG. 1;

FIG. 3 is a circuit diagram showing an example of a Y-coordinate detection circuit incorporated in the display-integrated tablet device of FIG. 1;

FIGS. 4(a) to 4(f) each are a timing chart showing operation of the Y-coordinate detection circuit of FIG. 3;

FIGS. 5(a) to 5(i) each are a timing chart showing an example of each of an electrode drive timing and a coordinate detection timing within a one-image-plane display period in the display-integrated tablet device of FIG. 1;

FIG. 6(a) to 6(f) each are a timing chart showing each of an electrode drive timing and a coordinate detection timing within a one-image-plane display period after coordinate discrimination is carried out in the display-integrated tablet device of FIG. 1;

Figure 11:
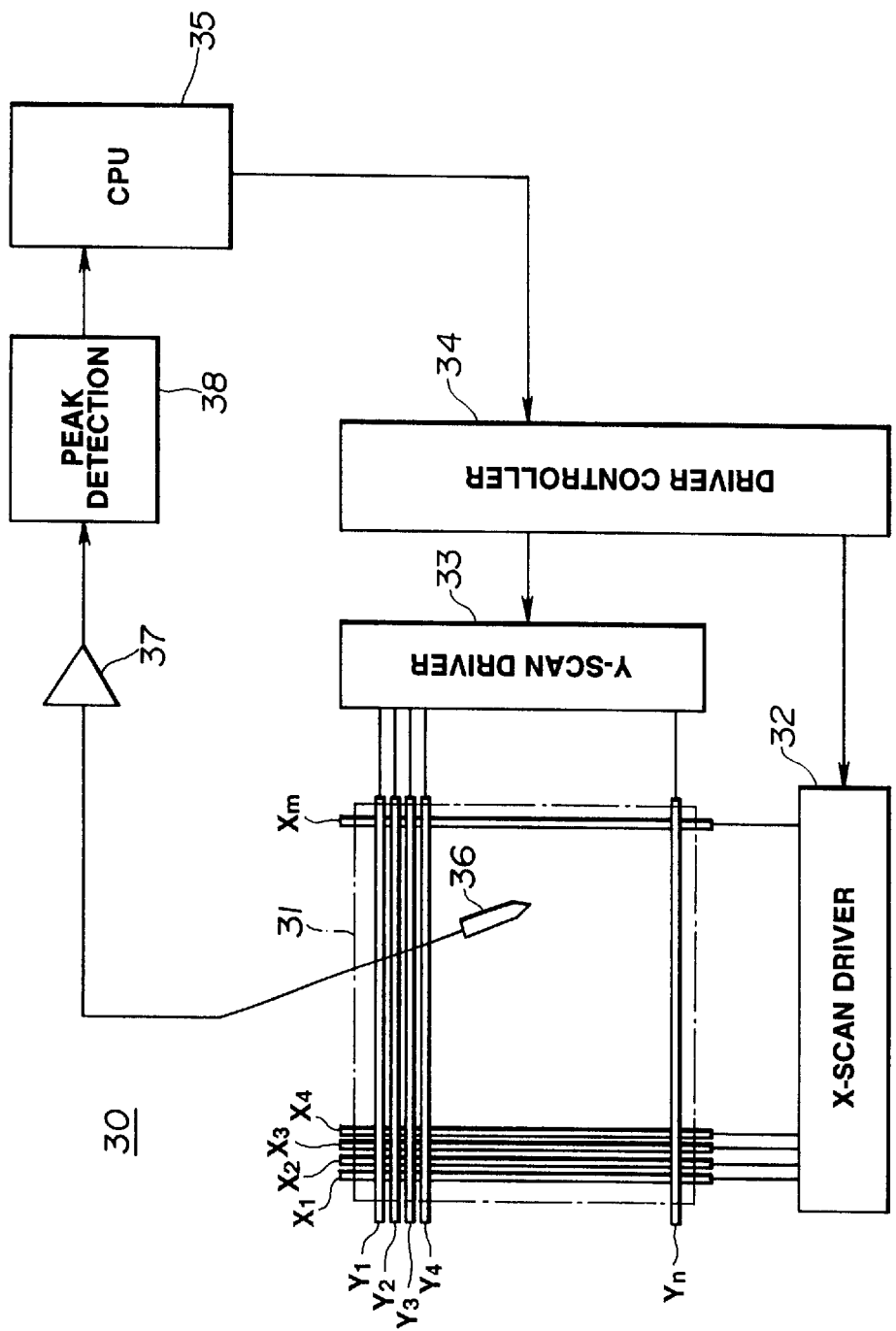
FIG. 11 is a block circuit diagram showing a conventional display-integrated tablet device.
Figure 12:
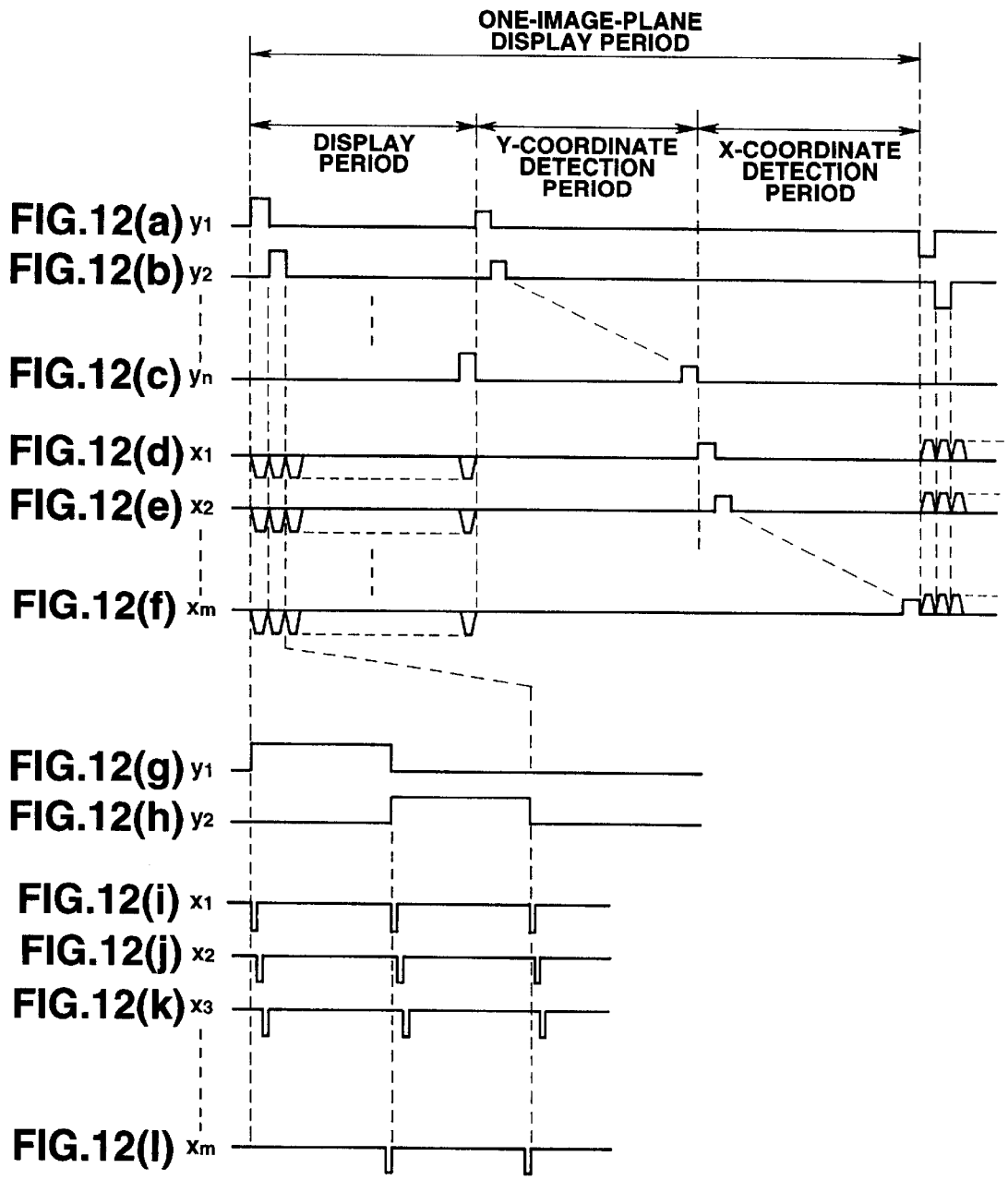
Figure 13:
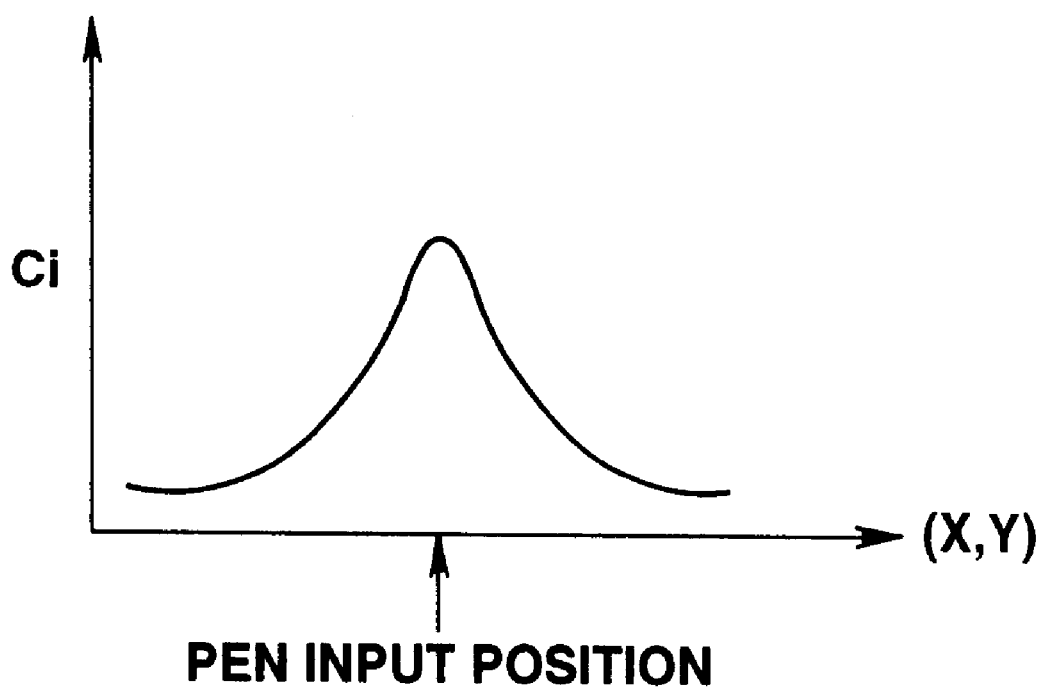

FIGS. 12(a) to 12(l) each are a timing chart showing an electrode scan timing in the conventional display-integrated tablet device of FIG. 11; and FIG. 13 is a graphical representation showing a voltage distribution due to electrostatic capacity coupling.

DETAILED DESCRIPTION OF THE PREFERRED EMBODIMENT

Now, a display-integrated tablet device according to the present invention will be described hereinafter with reference to an embodiment thereof illustrated in FIGS. 1 to 10, wherein a display having a field emission cathode incorporated therein, is used. Thus, the following description will be first made on a display of the field emission type.

Application of an electric field of about $10^9$ (V/m) to a surface of a metal or semiconductor material leads to a tunnel effect, which permits electrons to pass through a barrier, resulting in the electrons being discharged to a vacuum even at a normal temperature. Such a phenomenon is referred to as "field emission" and a cathode constructed so as to emit electrons based on such a principle is referred to as "field emission cathode".

Recently, semiconductor processing techniques permit a field emission cathode (hereinafter also referred to "FEC") of the surface discharge type to be formed of PEC arrays of a size as small as microns.

Figure 8A:
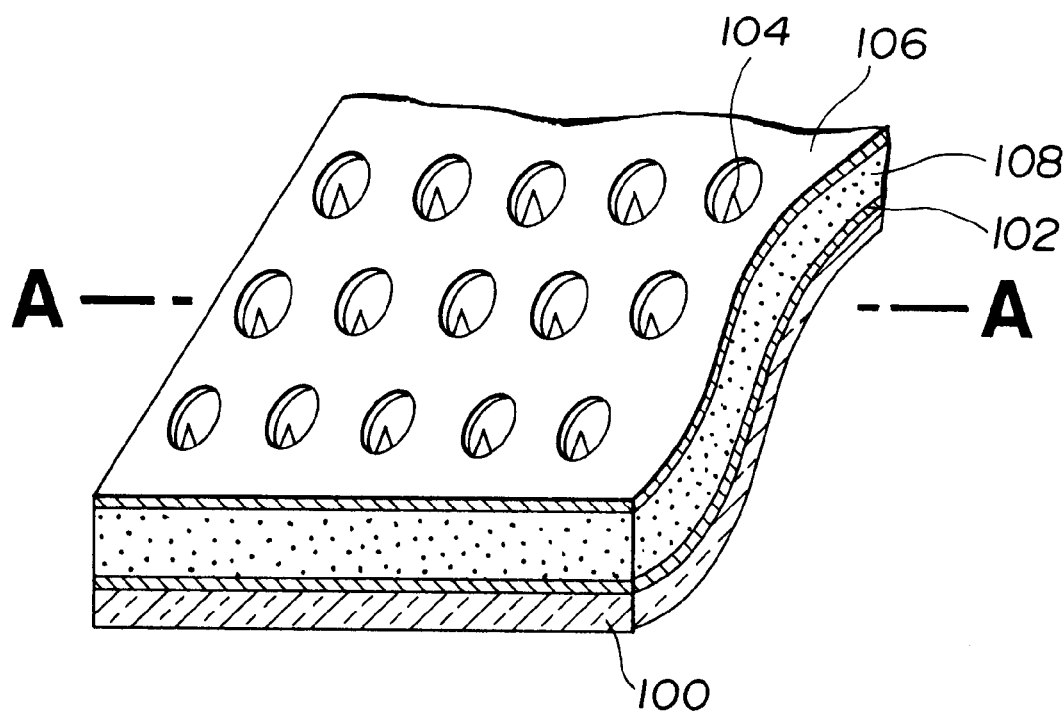
FIG. 8(a) is a perspective view.showing a Spindt-type field emission cathode which may be incorporated in the display-integrated tablet device of FIG. 1.
Figure 8B:
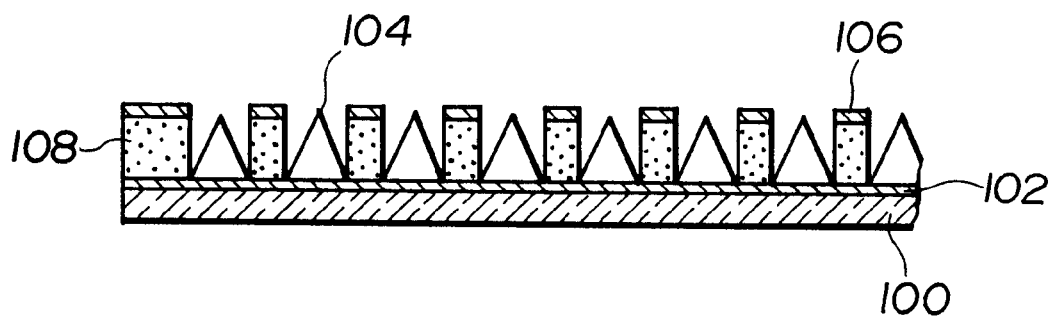
FIG. 8(b) is a sectional view taken along line A—A of FIG. 8(a)

FIGS. 8(a) and 8(b) show a Spindt-type FEC which is one example of the FEC of the surface discharge type. FIG. 8(a) is a perspective view of the PEC prepared by the semiconductor processing techniques and FIG. 8(b) is a sectional view taken along line A—A of FIG. 8(a). The FEC, as shown in FIGS. 8(a) and 8(b), includes a substrate 100, on which a cathode electrode 102 made of a metal material such as aluminum or the like is provided. The cathode electrode 102 is provided thereon with emitters 104 of a conical shape. The cathode electrode 102 is also provided thereon with a gate electrode 106 through a film 108 made of $SiO_2$. The conical emitters 104 are positioned in apertures formed through the gate electrode 106, so that the emitters 104 each are exposed at a distal end thereof from each of the apertures of the gate electrode 106.

The conical emitters 104 may be arranged so as to be spaced from each other at pitches as small as several microns, so that ten thousands to hundred thousands of such FECs may be formed on a single single substrate. Also, the semiconductor processing techniques permit a distance between the gate electrode 106 and the distal end of each of the emitters 104 to be set to be as small as submicrons, so that application of a voltage as low as tens of volts between the gate electrode 106 and the cathode electrode 102 may permit the emitters to field-emit electrons.

The FEC is formed into a flat shape, resulting in acting as a field emission cathode of the surface discharge type, which may be used for constructing a display device of the field emission type (hereinafter referred to as "FED" or "field emission display"). For example, a combination of such an FED with a conductor for coordinate detection such as a stylus pen permits coordinate detection to be carried out utilizing electrostatic capacity coupling between electrodes of the FED and a conductor for the detection, thus, it will be noted that the FED may be used for construction of a display-integrated tablet device.

Figure 9:
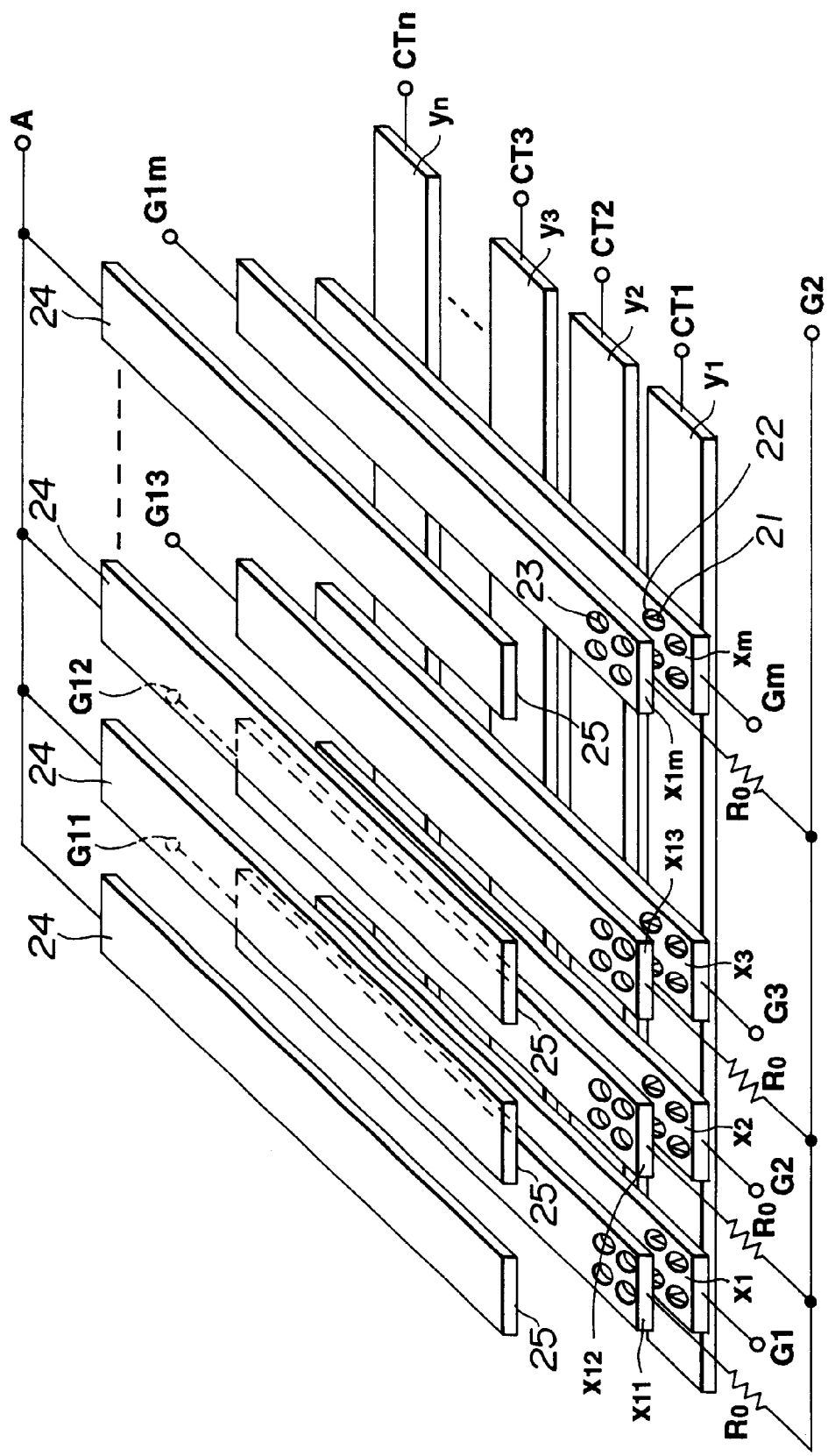
FIG. 9 is a perspective view showing a structure of the display-integrated tablet device shown in FIG. 1.

FIG. 9 shows such an FED as constructed as described above, which may be incorporated as a tablet in the display-integrated tablet device of the illustrated embodiment. The FED or tablet includes Y-electrodes or cathode electrodes $y_1$ to $y_n$ arranged in a stripe-like manner, which may be formed on a substrate. The cathode electrodes $y_1$ to $y_n$ are formed thereon with emitters 21 of a conical shape (FIGS. 8(a) and 8(b)) and connected to cathode terminals CT1 to CTn to which a drive pulse is fed.

The FED also includes X-electrodes or first gate electrodes $x_1$ to $x_m$ formed into strip-like shape and arranged on the cathode electrodes $y_1$ to $y_n$ through an insulator in a manner to be perpendicular to the cathode electrodes $y_1$ to $y_n$ and in a stripe-like manner. The first gate electrodes $x_1$ to $x_m$ are connected to gate terminals G1 to Gm. Thus, the cathode electrodes or Y-electrodes $y_1$ to $y_n$ and first gate electrodes or X-electrodes $x_1$ to $x_m$ cooperate with each other to form a matrix. The first gate electrodes $x_1$ to $x_m$ each are formed with a plurality of apertures 22 through which electrons field-emitted from conical emitters 21 formed on the cathode electrodes $y_1$ to $y_n$ are outwardly discharged therethrough.

The FED further includes second gate electrodes $x_{11}$ to $x_{1m}$ arranged above the first gate electrodes $x_1$ to $x_m$ in a manner like the first gate electrodes. The second gate electrodes $x_{11}$ to $x_{1m}$ are connected at one end thereof through resistors $R_0$ to a second gate lead-out electrode $G_2$ and at the other end thereof to second gate terminals G11 to Glm to which a voltage induced between the second gate electrodes $x_{11}$ to $x_{1m}$ and a stylus pen 10 due to electrostatic capacity coupling as described hereinafter is input.

The resistor $R_0$ is constructed so as to exhibit a high resistance value, to thereby ensure that a variation in voltage across the second gate electrodes due to a pulse for detection of an X-coordinate described hereinafter is input thereto from an X-coordinate detection circuit 8.

The second gate electrodes $x_{11}$ to $x_{1m}$ each are formed with apertures 23 in a manner to be positionally aligned with the apertures 22 of each of the first gate electrodes $x_1$ to $x_m$, so that electrons field-emitted from the conical emitters 21 formed on the cathode electrodes $y_1$ to $y_n$ are outwardly discharged through the apertures 23. Operation of the second gate electrodes will be detailedly described hereinafter.

Furthermore, the FED includes anode electrodes 24 arranged in a manner to be opposite to the second gate electrodes $x_{11}$ to $x_{1m}$ and first gate electrodes $x_1$ to $x_m$. The anode electrodes 24 may be formed on a glass substrate for display arranged above the gate electrodes and arranged in a stripe-like manner so as to positionally correspond to the second gate electrodes $x_{11}$ to $x_{1m}$ and therefore the first gate electrodes $x_1$ to $x_m$. The anode electrodes 24 is connected to an anode lead-out electrode A. The anode electrodes 24 each have a phosphor 25 deposited on a surface thereof opposite to each of the second gate electrodes $x_{11}$ to $x_{1m}$. The phosphor 25 is excited due to impingement of electrons thereon.

The above-described elements are encapsulated in a hermetic envelope and the above-described terminals are led out from the envelope, resulting in constructing a display-integrated tablet.

Now, the manner of driving of the FED for image display will be schematically exemplified hereinafter.

The anode electrodes 24 each have a voltage of a substantially constant level applied thereto by the anode lead-out electrode A. The cathode electrodes or Y-electrodes $y_1$ to $y_n$ are fed at the cathode terminals CT1 to CTn thereof with a scan pulse, to thereby be scanned, resulting in being selected and driven in turn.

The cathode terminals CT1 to CTn are scanned in turn while keeping a positive anode voltage applied to the anode lead-out electrode A for driving the anode electrodes 24, during which the gate terminals G1 to Gm each have a voltage applied thereto depending on data on an image signal in synchronism with a timing of scanning of the cathode terminals. This results in picture cells of the phosphors 25 provided on the anode electrodes 24 being excited by electrons emitted from the cathode electrodes $y_1$ to yn scanned and subject to luminous control depending on the voltage applied to the gate terminals G1 to Gm, thus, one image plane (one field) for an image is displayed.

It is considered that the conical emitters 21 each emit electrons while spreading them at an angle of about 30 degrees. Thus, electrons emitted from the emitters 21 are caused to diffuse to a certain degree before they impinge on the phosphors 25, leading to deterioration of resolution of an image displayed and the like. In order to avoid such a problem, a constant voltage of a predetermined level such as, for example, about 9 V is applied to the second gate electrodes $x_{11}$ to $x_{1m}$, so that electrons emitted from the emitters 21 are permitted to reach the anode electrodes 24 while being drawn into the apertures 23 of the second gate electrodes $x_1$ to $x_{1m}$, resulting in diffusion of electrons being effectively controlled.

Figure 10:
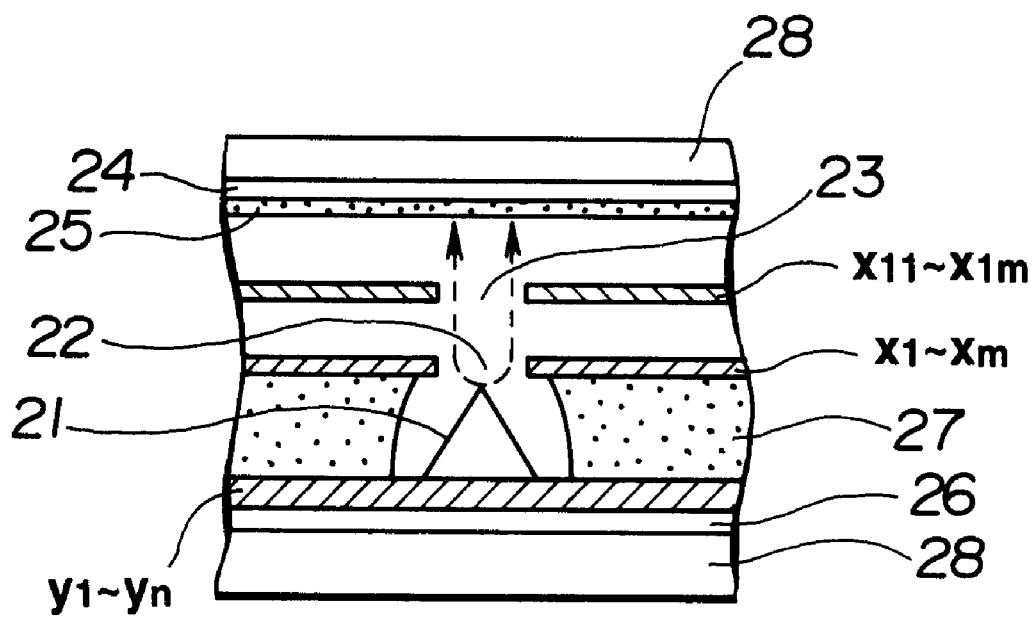
FIG. 10 is a fragmentary sectional view showing an essential part of the structure of FIG. 9.

In FIG. 10, reference numeral 26 designates a substrate on which the cathode electrodes $y_1$ to $y_n$ are formed, 27 is a film made of $SiO_2$ so as to act as an insulating layer, and 28 is a glass plate constituting a part of the hermetic envelope.

Now, a display-integrated tablet device in which the FED thus constructed is incorporated as a tablet will be described hereinafter with reference to FIG. 1.

Figure 1:
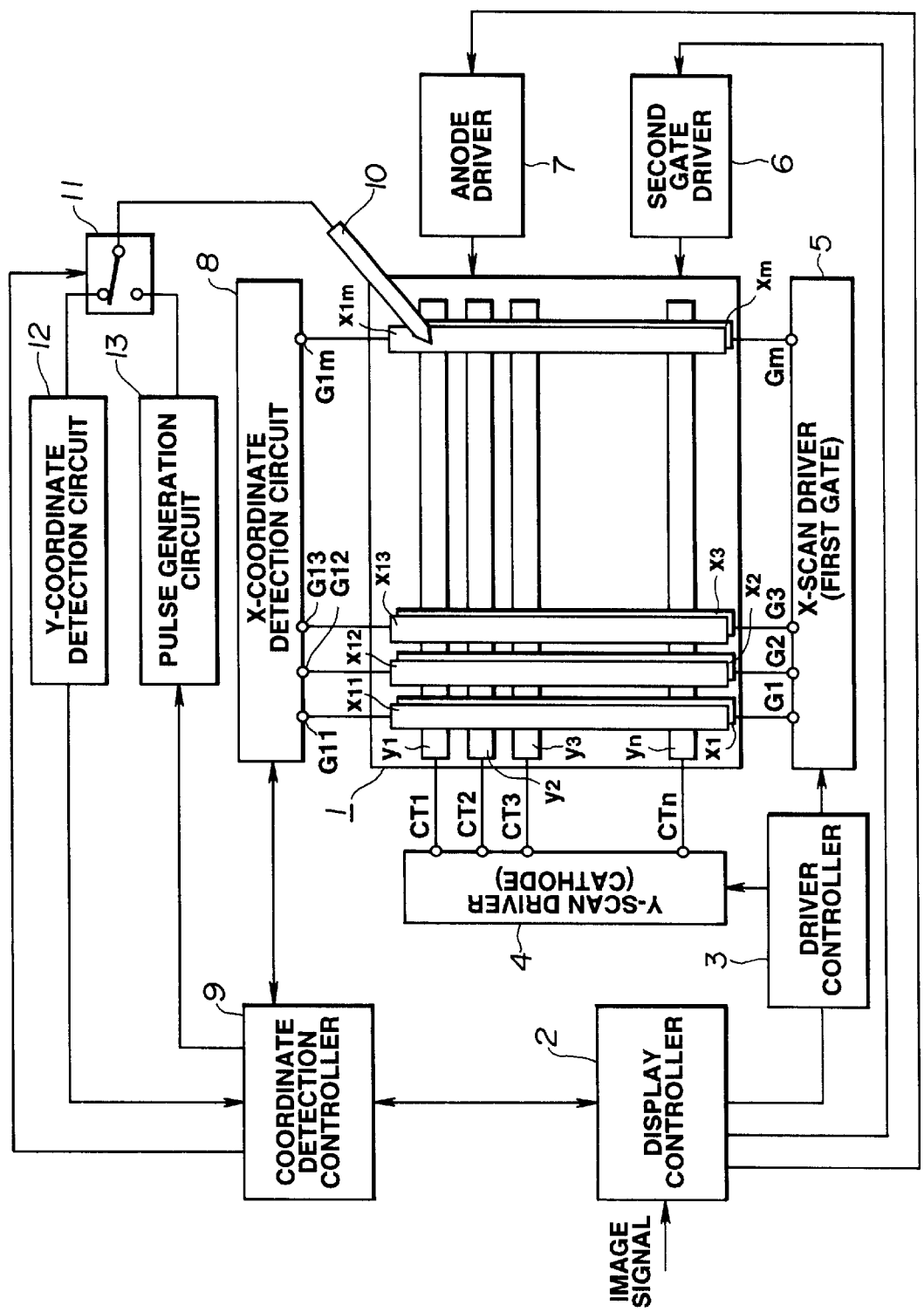

In FIG. 1, reference numeral 1 designates a tablet which comprises an FED constructed in the manner described above with reference to FIG. 9. In FIG. 1, anode electrodes 24 (phosphors 25), an anode lead-out electrode A and a second gate lead-out electrode $G_2$ are not shown for the sake of brevity. The anode electrodes 24 may be arranged on second gate electrodes $X_{11}$ to $x_{1m}$ and the anode lead-out electrode A may be connected to an anode driver 10 described hereinafter. Also. the second gate lead-out electrode $G_2$ may be connected to a second gate driver 6 described hereinafter.

Reference numeral 2 designates a display controller, which functions to feed a driver controller 3 with display data based on an image signal input thereto during a display period described hereinafter and a control signal for cathode electrode or Y-electrode detection scanning during a Y-coordinate detection period. The display controller 2 is connected to a coordinate detection controller 9, to thereby control a coordinate detection timing of the coordinate detection controller 9 and generate predetermined display data based on X-Y coordinate detection data input thereto.

The driver controller 3 controls a timing of application of a scan voltage from a Y-scan driver 4 based on image data input thereto from the display controller 2 and a control signal during Y-coordinate detection, as well as a timing of application of a voltage depending on image data of an X-scan driver 5. Also, the driver controller 3 controls application of a voltage of each of the second gate driver 6 and an anode driver 7.

The Y-scan driver 4, as shown in FIG. 1, is connected to the cathode terminals CT1 to CTn of the cathode electrode or Y-electrodes $y_1$ to $y_n$, and feeds the Y-electrodes $y_1$ to $y_n$ with a scan signal for image display or coordinate detection at a predetermined timing according to an output signal of the driver controller 3.

The X-scan driver 5 is connected to the first gate terminals G1 to Gm of the first electrodes or X-electrodes $x_1$ to $x_m$ and feeds the X-electrodes $x_{1\ to\ xm}$ with a voltage for image display at a predetermined timing according to a drive signal based on image data output from the driver controller 3.

The second gate driver 6 is connected to the second gate lead-out electrode $G_2$ of the tablet 1 and applies a voltage of a predetermined constant value to the second gate electrodes $x_{11}$ to $x_{1m}$ depending on control by the driver controller 3.

The anode driver 7 is connected to the anode lead-out electrode A of the tablet 1 and applies, to the anode electrodes 24, a positive anode voltage for driving the anode voltages 24 depending on control by the driver controller 3.

The X-coordinate detection circuit 8 is connected to the second gate terminals G11 to Glm of the second gate electrodes $X_{11}$ to $x_{1m}$. The X-coordinate detection circuit 8 includes a holding circuit section for temporarily holding therein a voltage value for every second gate electrode input thereto from the second gate terminals G11 to Glm, a peak detection section for taking, out of the holding circuit section, the voltage value for every electrode held in the holding circuit section and detecting a peak position of the voltage value, and the like, as described hereinafter.

The coordinate detection controller 9 functions to discriminate an X-Y coordinate based on a timing of each of an X-coordinate peak detection signal output from the X-coordinate detection circuit and a Y-coordinate peak detection signal output from a Y-coordinate peak detection circuit described hereinafter. to thereby provide coordinate data. Then, the coordinate data are fed to the display controller 2 or a required circuit (not shown), which carries out predetermined processing based on the coordinate data. Also, the coordinate detection controller 9 operates a pulse generation circuit 13 depending on a timing of detection of each of the X-coordinate and Y-coordinate and controls switching of a pen operation changing-over switch 11.

The stylus pen 10 acting as the conductor for detection is adapted to be abutted at a distal end thereof for detection or a pen point thereof against a surface of the tablet 1. The stylus pen 10 is changed over between a first operation state of outputting a pulse signal generated in the pulse generation circuit and a second operation state of feeding a voltage induced between the pen point and the Y-electrode due to electrostatic capacity coupling to a Y-coordinate peak detection circuit 12, depending on switching of the pen operation changing-over switch 11.

The pen operation changing-over switch 11 is selectively changed over so as to permit any one of the Y-coordinate peak detection circuit 12 and pulse generation circuit 13 to be connected to the stylus pen 10, and a timing at which the switch 11 is changed over is controlled by the coordinate detection controller 9.

The Y-coordinate peak detection circuit 12 has a voltage for detection induced between the Y-electrode and the stylus pen 10 during coordinate detection through the pen operation changing-over switch 11 input thereto. The Y-coordinate peak detection circuit 12 may comprise, for example, a comparator for comparing a voltage value input thereto with a predetermined threshold level. The voltage for detection input thereto is distributed as shown in FIG. 13. The threshold value described above is set so as to permit a peak value of the waveform of FIG. 13 to be detected, so that the Y-coordinate peak detection signal may be obtained on the basis of an output of the comparator. The Y-coordinate peak detection signal thus obtained is fed to the coordinate detection controller 9.

The pulse generation circuit 13 for generating a high-frequency pulse is adapted to generate a pulse signal for Y-coordinate detection depending on a timing of control of the coordinate detection controller 9. The pulse signal thus generated is fed through the pen operation changing-over switch 11 to the stylus pen 10.

Figure 2A:
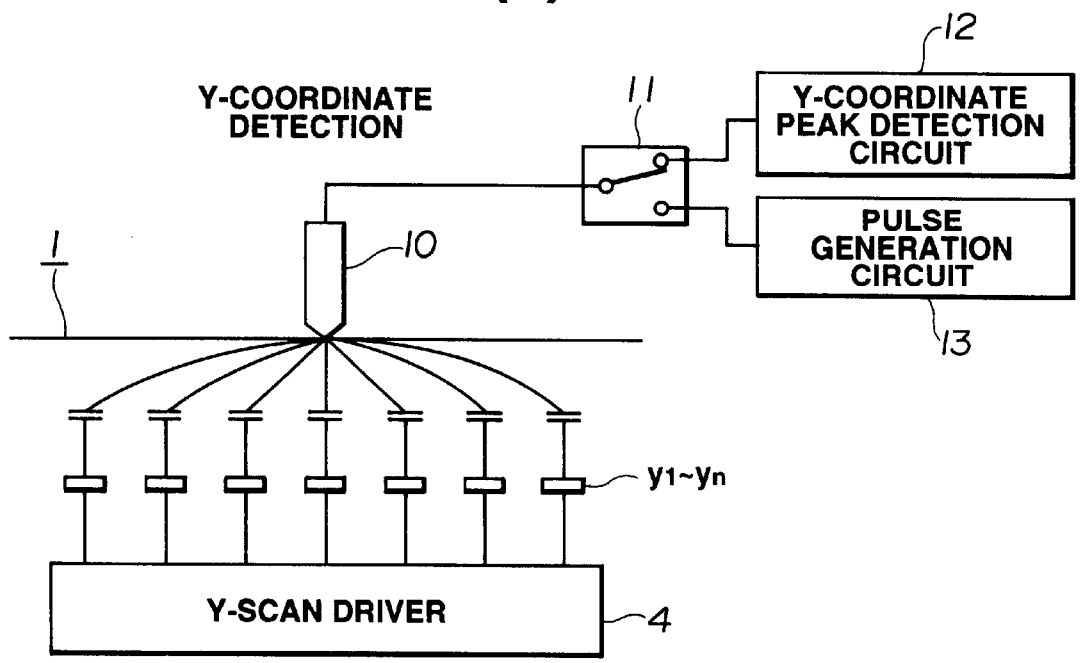

Now, the manner of operation of the stylus pen 10 will be described hereinafter with reference to FIGS. 2(a) and 2(b). wherein FIG. 2(a) shows a state of Y-coordinate detection described below during which the pen operation changing-over switch 11 is kept changed over to a side of the Y-coordinate peak detection circuit 12.

During the Y-coordinate detection, the Y-scan driver 4 feeds the Y-electrodes with a scan signal for line display in turn. Thus, when the stylus pen 10 is kept abutted against the tablet 11, a voltage is induced between the Y-electrode and the pen point of the stylus pen 10 due to electrostatic capacity coupling, as equivalently indicated as a capacitor in FIG. 2(a). The stylus pen 10 has the thus-induced voltage input as a Y-coordinate detection signal thereto and then feeds it to the Y-peak detection circuit 12 through the pen operation changing-over switch 11.

Figure 2B:
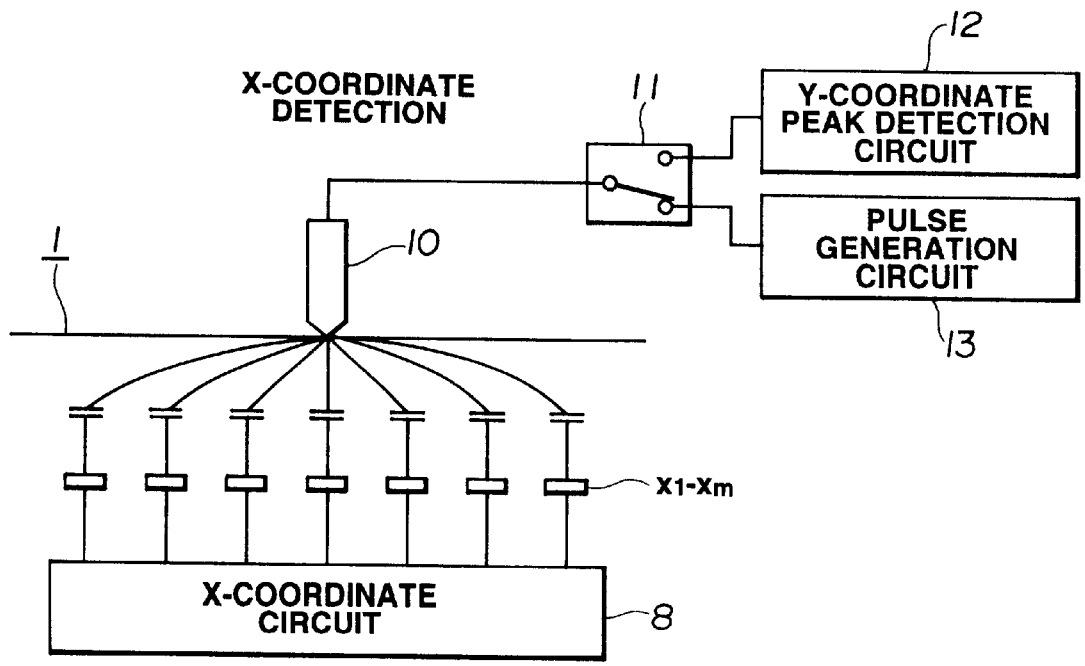

During the X-coordinate detection described below, the pen operation changing-over switch 11 is changed over to a side of the pulse generation circuit 13 as shown in FIG. 2(b), so that the pulse generation circuit 13 may generate a pulse for coordinate detection through control by the coordinate detection controller 9. This causes the stylus pen 10 to generate a pulse for coordinate detection. Thus, supposing that the pen point of the stylus pen 10 is kept abutted against the during the X-coordinate detection, a pulse voltage is caused to be applied to the various electrodes. However, in the present invention, a voltage due to electrostatic capacity coupling between the second gate electrode and the pen point of the stylus pen is input through the second gate terminals G11 to G1m to the X-coordinate detection circuit 8, as equivalently shown in FIG. 2(a).

Now, an example of the X-coordinate detection circuit 8 which carries out peak detection will be described hereinafter with reference to FIG. 3.

The X-coordinate detection circuit 8 has a voltage which is obtained across each of the second gate electrodes $x_{11}$ to $x_{1m}$ through the second gate terminals G11 to G1m input thereto.

Figure 3:
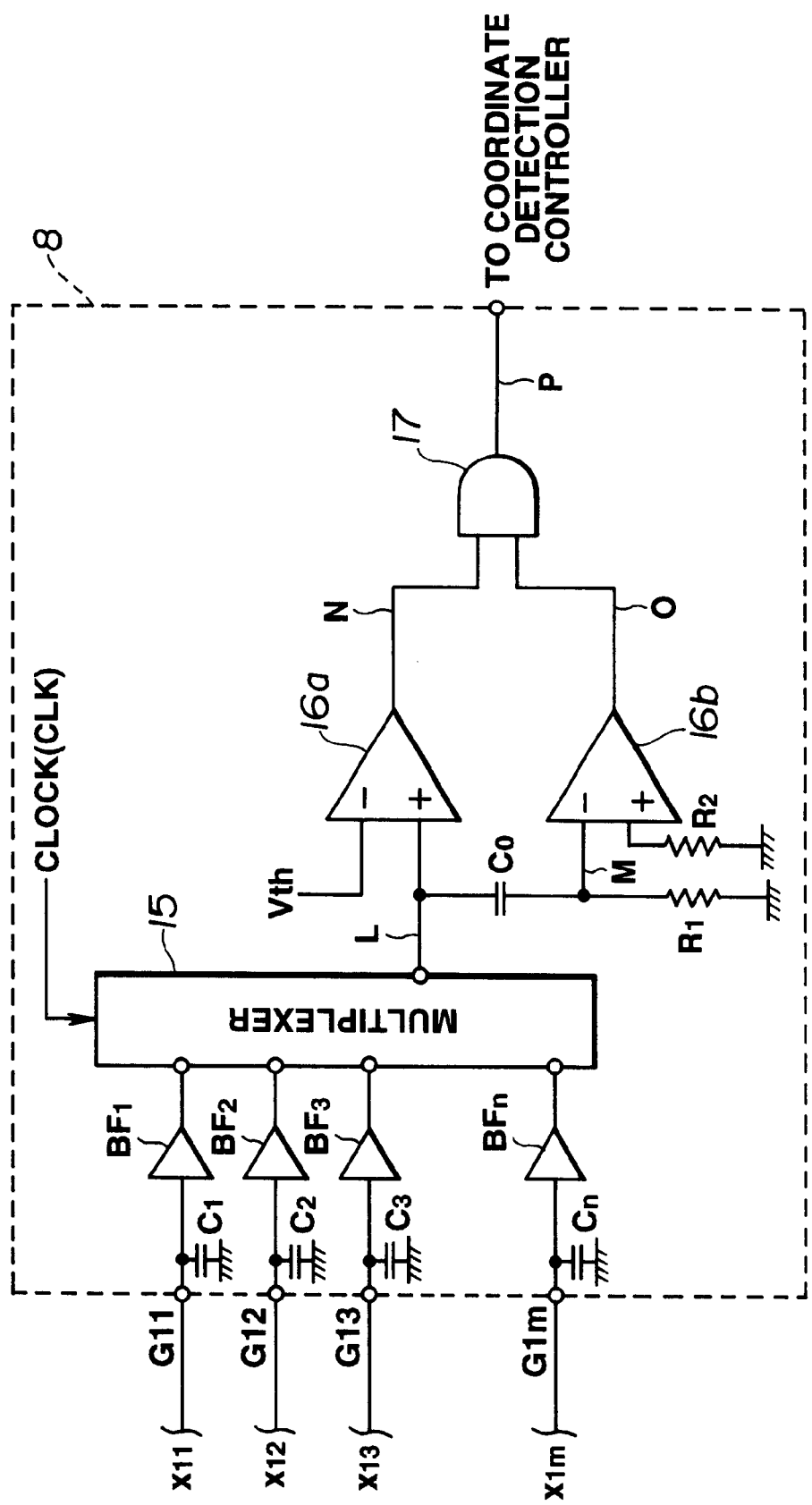

In FIG. 3, reference characters $C_1$ to $C_n$ designate capacitors which are arranged in the X-coordinate detection section 8 indicated at dotted lines and each serve as a holding element for holding therein a voltage for every electrode input thereto. $BF_1$ to $BF_n$ each are a buffer amplifier and 15 is a multiplexer, which functions to output a voltage of each of the second gate electrodes input thereto in turn at a timing based on, for example. a clock CLK fed thereto from the coordinate detection controller 9. $C_0$ is a capacitor, and $R_1$ and $R_2$ each are a resistor. The capacitor $C_0$ and resistor $R_1$ cooperate with each other to form a differentiating circuit. 16a and 16b each are a comparator and 17 is an AND circuit.

Figure 4:
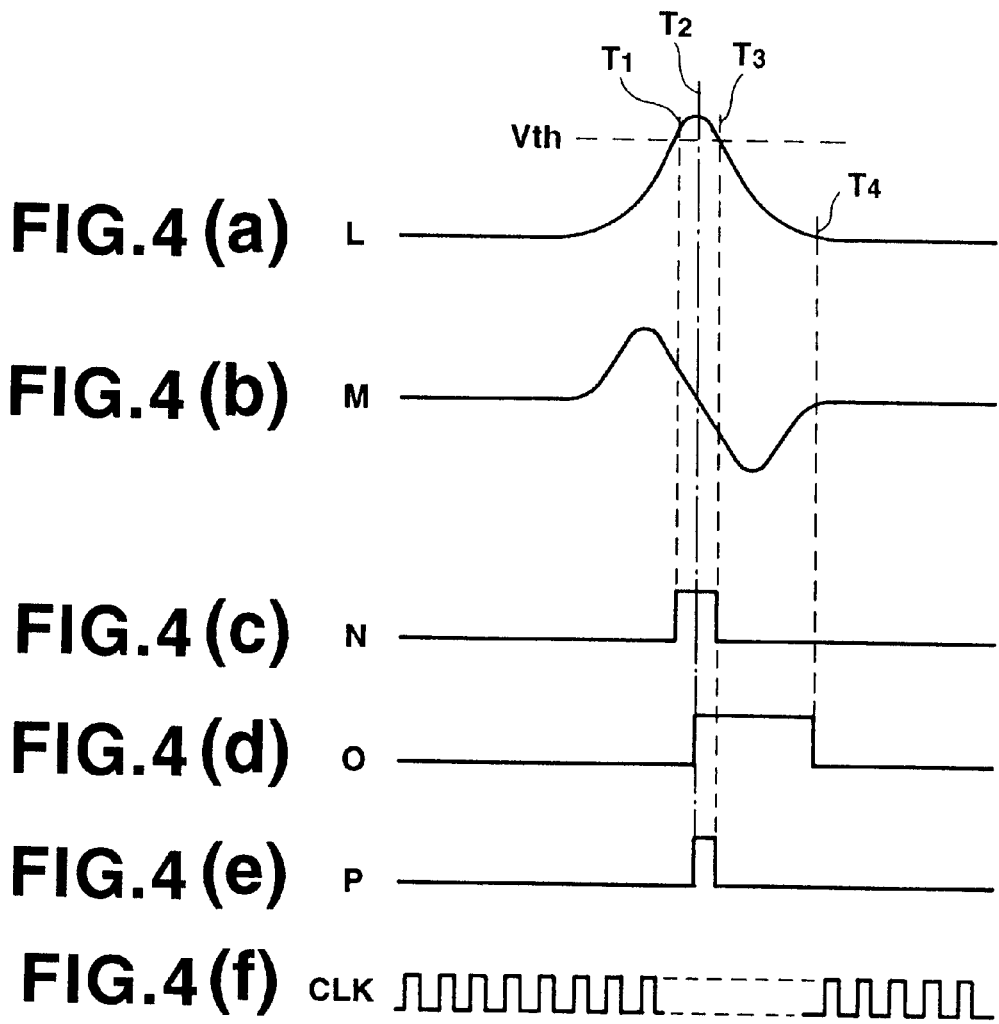

Now, the manner of operation of the X-coordinate detection circuit 8 will be described hereinafter with reference to FIG. 4. First, during operation of the X-coordinate detection circuit 8, X-coordinate detection is carried out, so that the stylus pen 10 is caused to feed a pulse for coordinate detection to the tablet 1 as shown in FIG. 2(b).

Such generation of the pulse from the stylus pen 10 causes a voltage across each of the second gate electrodes to be input to the X-coordinate detection circuit 8 due to electrostatic capacity coupling. The voltage thus input is then temporarily held in each of the capacitor $C_1$ to $C_N$.

Then, the multiplexer 15 successively outputs the voltage held in each of the capacitors $C_1$ to $C_n$ based on a timing of the clock CLK. For example, first the voltage held in the capacitor $C_1$ is output from the multiplexer 15 through the buffer amplifier $BF_1$ and then the voltage held in the capacitor $C_2$ is likewise output from the multiplexer 15 based on a timing of the next clock CLK. Finally, the voltage held in the capacitor $C_n$ is output from the multiplexer 15.

As the voltage value for each of the second gate electrodes is output from the multiplexer 15, a voltage of such a waveform as shown in FIG. 4(a) is obtained as an output L of the multiplexer 15 depending on a position of the stylus pen 12 on the tablet. The output L is then fed to a non-inversion input terminal of the comparator 16a and shaped into a signal of a waveform M shown in FIG. 4(b) by the differentiating circuit comprising the capacitor $C_O$ and resistor $R_I$, which signal is then fed to an inversion input terminal of the comparator 16b.

The comparator 16a compares a waveform of the output L input thereto with a threshold level Vth (FIG. 4(a)) input to the inversion input thereof, to thereby output an H level during a period of time for which the output L exceeds the threshold level, as shown in FIG. 4(c).

The comparator 16b outputs an H level as shown in FIG. 4(d) during a period of time for which the level is kept negative or the output L falls from its peak to a zero level. Thus, the AND circuit 17 to which the output of each of the comparators 16a and 16b is input outputs a signal P which rises at the time when the output L reaches a peak and has a reduced pulse width as shown in FIG. 4(e) to the coordinate detection controller 11.

For example, the coordinate detection controller 11 carries out comparison between time at which the signal P is input thereto and a timing of the clock CLK to detect the second gate electrode or a coordinate position in a row direction at which a peak of the detection voltage has been obtained. As described above with reference to FIG. 9, the second gate #electrodes $x_{11}$ to $x_{1m}$ are arranged in correspondence to the X-electrodes or first gate electrodes, thus, the above-described operation means that the X-coordinate is detected.

The structure and operation of the X-coordinate detection circuit 8 shown in FIGS. 3 and 4(a) to 4(f) are merely an example thereof. For example, the X-coordinate detection circuit 8 may be constructed so that a voltage of the second gate electrode input thereto is converted into a digital signal by means of an A/D converter, of which a peak point is obtained by means of an operation circuit.

Now, the manner of operation of image display and coordinate detection by the display-integrated tablet device constructed as described above will be described hereinafter with reference to FIGS. 5(a) to 5(i), each of which shows a timing of each of image display and coordinate detection operation in a one-image-plane display period of the display-integrated tablet device of the illustrated embodiment.

FIG. 5(a) shows synchronous signals, wherein a period between each adjacent two of the synchronous signals is defined to be a one-image-plane display period $T_F$, which corresponds to one frame or one field. The synchronous signal is extracted by image data in the display controller 2, resulting in controlling a scan pulse for image display and a timing of coordinate detection operation.

In the illustrated embodiment, during the one-image-plane display period $T_F$, line scanning is successively carried out to accomplish display for one image plane and a voltage induced from the stylus pen 10 due to electrostatic capacity coupling is detected for Y-coordinate detection during a period of time for which a data voltage is kept from being applied to the X-electrodes during a period of time for which a display scan pulse of the Y-electrodes is output.

Also, for X-coordinate detection, a pulse signal is generated from the stylus pen 10 and a voltage induced across the second gate electrodes $x_{11}$ to $x_{1m}$ due to electrostatic capacity coupling is taken in the X-coordinate detection circuit 8.

As described above with reference to FIG. 10, the second gate electrodes function to control diffusion of electrons emitted from the emitters 21 and have a voltage of a predetermined constant level applied thereto as shown in FIG. 5(g). Therefore, a voltage applied to the second gate electrodes are 0V as an AC voltage even during an image display period. Thus, when the second gate electrodes are fed with an AC component which permits a plurality of pulse signals to be applied thereto, a variation in voltage depending on the pulse signals is caused to occur in the second gate electrodes, so that it may be fed in the form of a detection signal to the X-coordinate detection circuit 8.

In the tablet 1 of the illustrated embodiment, as described above with reference to FIGS. 9 and 10, it is required to apply a positive anode voltage to the anode electrodes for image display. Therefore, the anode electrodes 24 are placed in a state of being driven by the anode driver 7 at least during the display operation, although it is not shown in FIGS. 5(a) to 5(i).

Under such conditions as described above, a first Y-coordinate detection period $Ty_1$ is provided at the start of the one-image-plane display period $T_F$. During the first Y-coordinate detection period $Ty_1$, first the pen operation changing-over switch 11 is changed over to the side of the Y-coordinate peak detection circuit 12 through the coordinate detection controller 9 (FIG. 2(a)), to thereby permit a voltage due to electrostatic capacity coupling to be input through the stylus pen 10. Then, as shown in FIG. 5(b), a scan pulse for display of a first line or a line of the Y-electrode $y_1$ is caused to rise during the period.

At this time, when the pen point of the stylus pen 10 is kept abutted against any desired position on a display plane of the tablet 1, a voltage value depending on a distance between the pen point and the Y-electrode $y_1$ 1is input thereto from the stylus pen 10. Then, the voltage value is fed in the form of a Y-coordinate detection signal to the Y-coordinate peak detection circuit 12.

Thus, in the illustrated embodiment, the Y-coordinate detection period may be defined to be a period during which the voltage value successively obtained for each of the Y-electrodes scanned for detection by the Y-scan driver 4 is fed through the stylus pen 10 to the Y-coordinate peak detection circuit 12. Also, during each of Y-coordinate detection periods $Ty_2$ to $Ty_n$ shown in FIGS. 5(a) to 5(i), like operation of the stylus pen 10 is carried out with respect to the Y-electrodes $y_2$ to $y_n$, respectively.

When the first Y-coordinate detection period $Ty_1$ terminates, operation proceeds to a first-line display/X-coordinate detection period $T_{L1}$. In the period, image display of a first line and X-coordinate detection operation take place.

First, display operation in the first-line display/X-coordinate detection period $T_{L1}$ will be described. During the period, as shown in FIG. 5(b), the scan pulse with respect to the Y-electrode $y_1$ which rose during the preceding Y-coordinate detection period $Ty_1$ is still continuously output. Concurrently, as shown in FIG. 5(f), a voltage depending on image data is applied from the X-scan driver 5 to each of the X-electrodes or first gate electrodes $x_1$ to $x_m$. In this instance, a scan timing of each of the Y-scan driver 4 and X-scan driver 5 is set so as to permit a voltage depending on display data to be successively applied to each of the X-electrodes $x_1$ to $x_m$ during a scan period of one Y-electrode, for example, as in FIGS. 12(g) to 12(f). Alternatively, display data may be concurrently fed to the X-electrodes $x_1$ to x.

Then, like display operation is carried out during each of a second-line display period $TL_2$ to a n-th-line display period $T_{Ln}$. Thus, line scanning is carried out on the first to last or n-th lines, during which electrons emitted from the conical emitters are caused to be impinged on the anode electrodes 24 (FIG. 9) at intersections between the X-electrodes and the Y-electrodes which have a voltage applied thereto, so that the phosphors 25 formed on the anode electrodes 24 may be excited for luminescence, leading to image display for one image plane.

Now, X-coordinate detection operation during the firstline display/X-coordinate detection period $TL_1$ will be described. At certain time during the period, a pulse output period $T_p$ is set as shown in FIG. 2(h). During the pulse output period $T_p$, the pen operation changing-over switch 11 is changed over to the side of the pulse generation circuit 13, to thereby permit the stylus pen 10 to generate a plurality of pulse signals.

Also, during the period, the pen point of the stylus pen 10 is kept abutted against any desired position on the image plane of the tablet 1, resulting in a variation in voltage depending on the pulse signal induced between the pen point of the stylus pen 10 and each of the second gate electrodes of the tablet 1 due to electrostatic capacity coupling as shown in FIG. 5(g). Intensity of a voltage at each of the second gate electrodes is distributed as in FIG. 13. A voltage value induced across each of the second gate electrodes is input through each of the second gate electrode terminals G11 to Gam to the X-coordinate detection circuit 8 and then held therein.

At this time, the second gate electrodes each have a driving voltage applied thereto; however, the voltage is considered to be 0V as an AC voltage as described above. Thus, even during the image display period, when a plurality of pulse signals or AC components are output from the stylus pen 10, it is possible to obtain a variation in voltage depending on the pulse signals in the second gate electrodes. Also, the resistor $R_0$ of a high resistance value is connected between each of the second gate electrodes $x_{11}$ to $x_{1m}$ and the second gate driver 6, to thereby restrain a variation in driving voltage $VG_2$ during application of the pulse signals from the stylus pen 10, so that inputting of a detection voltage from the second gate electrodes G11 to G1m to the X-coordinate detection circuit 8 may be accomplished with high efficiency.

As described above, the illustrated embodiment permits at least the above-described operation to be carried out during the pulse output period $T_P$. Thus, it will be noted that the period $T_P$ is considered to be a period required for outputting the pulses for detection from the stylus pen 10 to generate the detection voltage with respect to each of the second gate electrodes due to electrostatic capacity coupling and taking the voltage in the X-coordinate detection circuit 8 to hold it therein.

At the time when the pulse output period $T_P$ elapses, a voltage of each of the second gate electrodes or a voltage distribution on the X-coordinate side is already obtained on the detection side (X-coordinate detection circuit 8, coordinate detection controller 9 and the like). A length of time required for the pulse output period $T_P$ is merely as short as several microseconds, so that outputting of the pulses to the tablet 1 may be instantaneously carried out, resulting in a disadvantage such as disturbance of an image displayed during the period being disregarded.

Then, after the pulse output period $T_P$ elapses, in the X-coordinate detection circuit 8, it is carried out to detect a peak position based on the voltage value input thereto from each of the second gate electrodes G and held therein and, for example, by the operation described above with reference to FIG. 4, to thereby output the peak position in the form of a peak detection signal to the coordinate detection controller 9. The coordinate detection controller 9 carries out X-coordinate discrimination based on a timing at which the peak detection signal is input thereto.

It is merely required that the X-coordinate detection operation to this point is carried out within the one-image-plane display period. Also, a position of setting of the pulse output period $T_P$ is not limited to the first line, therefore, it may be set in any other line display period. However, in view of a length of time required for detecting the X-coordinate by the coordinate detection controller 9, the pulse output period is preferably set in the initial line display period within the one-image-plane display period if possible.

Thus, it will be noted that during the first-line display/X-coordinate detection period $T_{L1}$, image display operation of the first line, operation of inputting a voltage obtained at the Y-electrode $y_1$ to the Y-coordinate peak circuit 12 and operation of taking a voltage value for each of all the second gate electrodes required for X-coordinate detection in the X-coordinate detection circuit 8 are carried out.

Thus, in periods subsequent to the first-line display/X-coordinate detection period $T_{L1}$, operation of inputting a voltage for detection for each of the remaining Y-electrodes $y_2$ to $y_n$ to the Y-coordinate peak circuit 12 (Y-coordinate detection periods $TY_2$ to $Ty_n$) and line display operation of the second to n-th lines (second-line display period $TL_2$ to n-th line display period $T_{Ln}$) are carried out.

Figure 5:
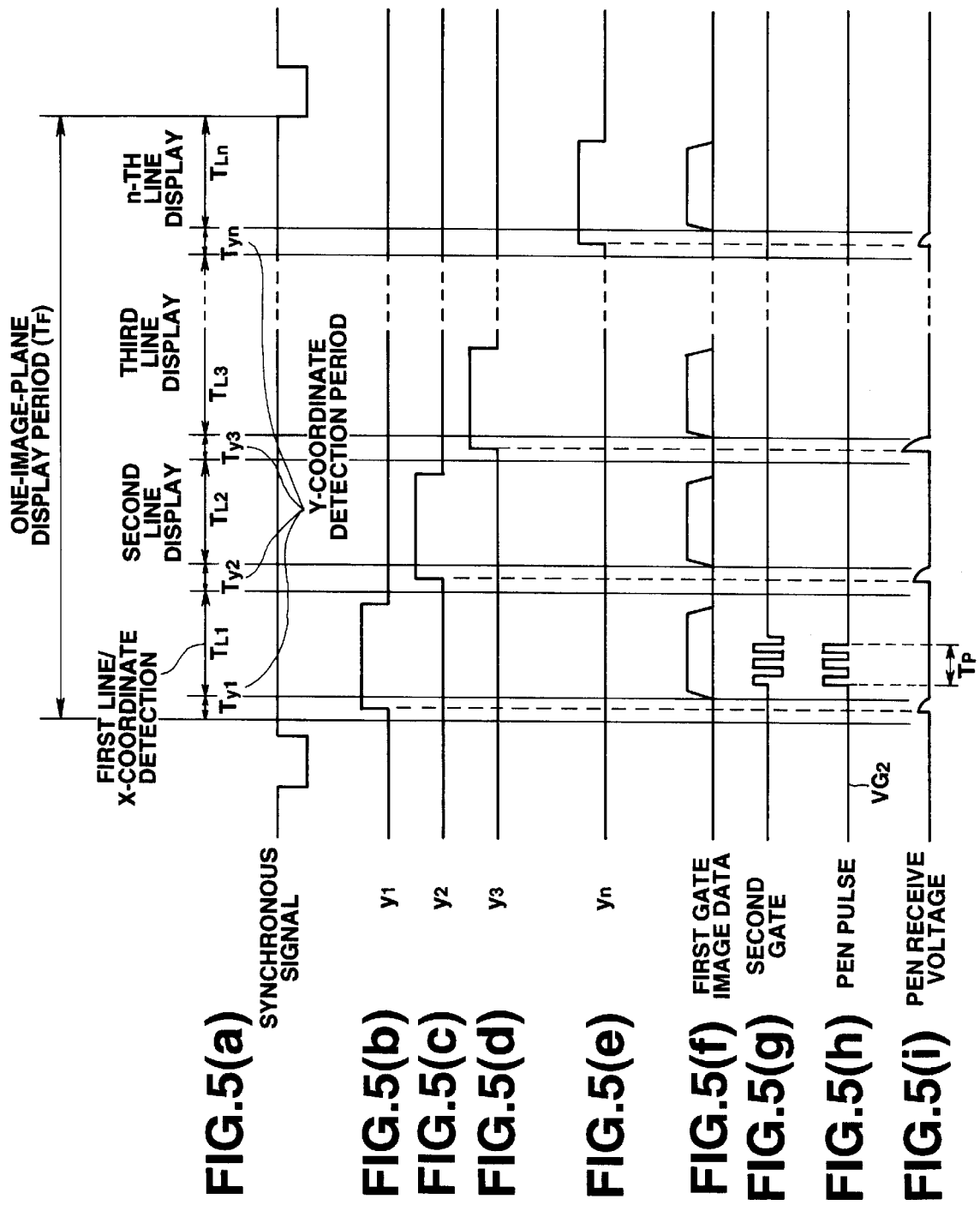
Figure 6:
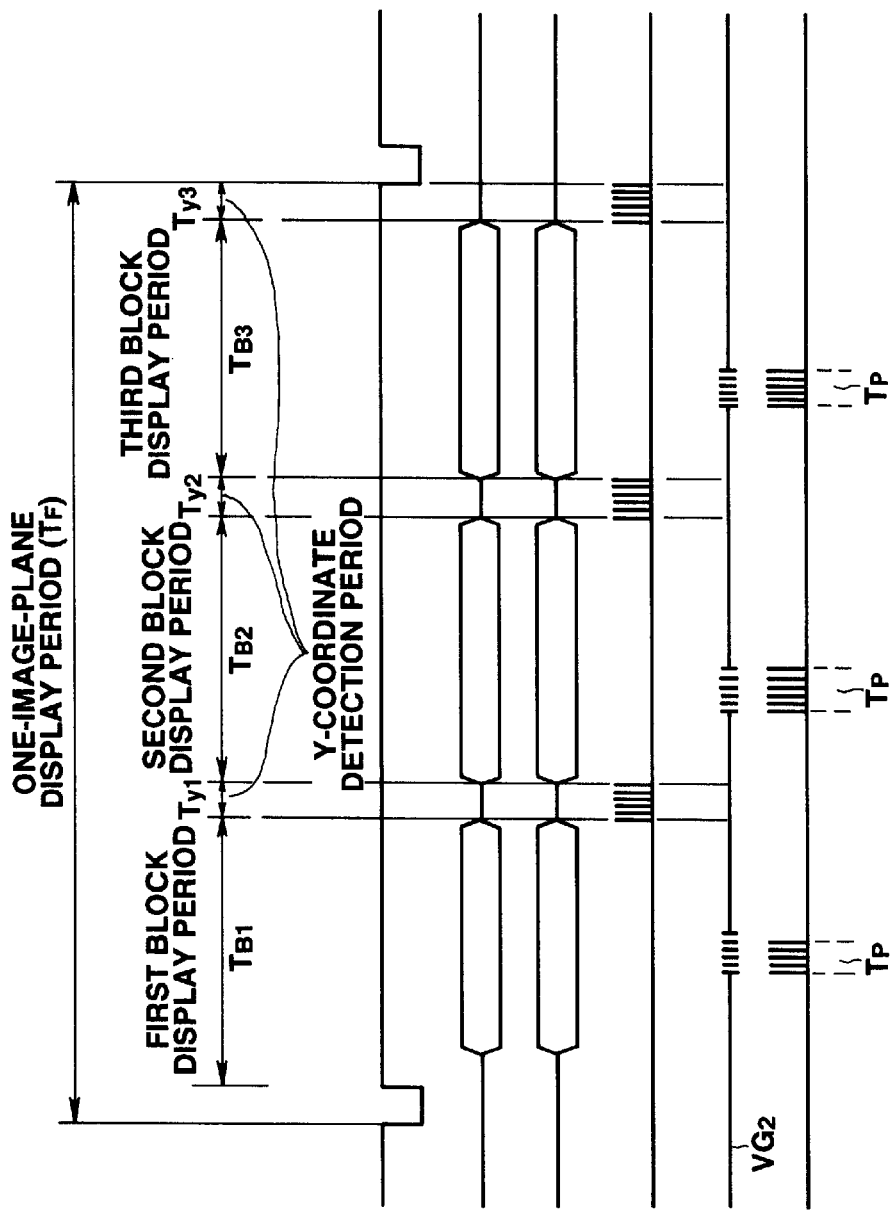

Thus, when the first-line display/X-coordinate detection period $T_{L1}$ terminates, the second Y-coordinate detection period $Ty_2$ is set, in which substantially the same operation as that in the preceding first Y-coordinate detection period $Ty_1$ is carried out to feed a voltage value (FIG. 5(*i*)) obtained at the time of rising of a scan pulse with respect to the Y-electrode $y_2$ from the stylus pen 10 to the Y-coordinate peak detection circuit 12.

When the second Y-coordinate detection period $TY_2$ elapses and the second-like display period $TL_2$ sets in, image display of the second line is carried out in substantially the same manner as display operation in the above-described first-line display/X-coordinate detection period $T_{L1}$.

Further, the second-line display period $TL_2$ elapses and the third Y-coordinate detection period $Ty_3$ sets in, wherein a voltage value (FIG. 5(*i*)) obtained at the time of rising of the scan pulse with respect to the Y-electrode $y_3$ shown in FIG. 5(*d*) is fed from the stylus pen 10 to the Y-coordinate peak detection circuit 12. Likewise, in the next third-line display period $TL_3$, line display is carried out with respect to the Y-electrode $y_3$ in substantially the same manner as in the preceding line display periods.

Thus, a combination between the Y-coordinate detection period and the line display period is repeated. so that finally the n-th Y-coordinate detection period $T_{Yn}$/n-th-line display period $T_{Ln}$ terminates, resulting in the one-image-plane display period $T_F$ ending. At this time, display for one image plane is completed and inputting of the voltage obtained at each of the Y-electrodes $y_1$ to $y_n$ is completed.

During the time, the Y-coordinate peak detection circuit 12 carries out peak detection of a voltage value input thereto from the stylus pen 10 and feeds a signal of the peak detection to the coordinate detection controller 9 at the time when the peak is detected. The coordinate detection controller 9 detects the Y-electrode at which the peak is obtained on the basis of a timing at which the peak detection signal is input thereto, to thereby discriminate the Y-coordinate.

Thus, the coordinate detection controller 9 may transmit data on the Y-coordinate thus discriminated and data on the X-coordinate discriminated as described above to, for example, the display controller 2. Then, the display controller 2 may carry out processing such as display control required or the like based on data on the X-Y coordinate input thereto.

Thus, the display-integrated tablet device of the illustrated embodiment is so constructed that Y-coordinate detection is carried out by inputting a voltage obtained by a line scan pulse fed to the Y-electrodes from the stylus pen 10 thereto in the form of a Y-coordinate detection signal and X-coordinate detection is carried out by connecting the second gate electrodes primarily provided for converging an angle of discharge of electrons from the emitters to the X-coordinate detection circuit 8. Then, the stylus pen 10 is caused to output a pulse, during which a voltage for every second gate electrode obtained due to electrostatic capacity coupling is taken in the X-coordinate detection circuit 8. This permits X-coordinate detection to be carried out during a period of time for which a certain line is subject to display scanning.

Therefore, the display-integrated tablet device of the illustrated embodiment.permits the X-Y coordinate detection to be carried out without periods for scanning the Y-coordinate and X-coordinate for coordinate detection other than the actual display period, to thereby substantially reduce a display interruption period in the one-image-plane display period $T_F$, unlike the prior art. Thus, the illustrated embodiment increases a part for which the actual image display period accounts of the one-image-plane display period $T_F$, to thereby improve luminance of an image displayed.

In the display-integrated tablet device of the illustrated embodiment, operation shown in FIGS. 5(a) to 5(i) may be repeated for one picture plane to carry out image display and coordinate inputting, to thereby provide an image with improved luminance. In this connection, the method of FIGS. 5(a) to 5(i) utilizes a scan pulse for line display with respect to the Y-electrode for Y-coordinate detection, resulting in one Y-coordinate detection being carried out for every image plane.

Thus, when the illustrated embodiment is so constructed that after the X-Y coordinate is once discriminated by the operation at the timing shown in FIGS. 5(a) to 5(i), the timing is changed over to a detection timing described hereinafter with reference to FIGS. 6(a) to 6(f) and FIG. 7, therefore, it is possible to carry out detection of the X-Y coordinate during the one-image-plane display period plural times.

FIG. 6(a) shows synchronous signals in a period in which one frame or one field is displayed, wherein a period between each adjacent two synchronous signals is defined to be a one-image-plane display period $T_F$.

In the illustrated embodiment, the one-image-plane period $T_F$ is divided into a first block display period $T_{B1}$, a second block display period $T_{B2}$ and a third block display period $T_{B3}$, and Y-coordinate detection periods $Ty_1$, $Ty_2$ and $Ty_3$ are defined immediately after the first to third block display periods, respectively. The first to third blocks referred to herein each indicate a range of display regions divided in a direction of the Y-electrodes (scanning lines) of a display plane P as shown in FIG. 7.

Figure 7:
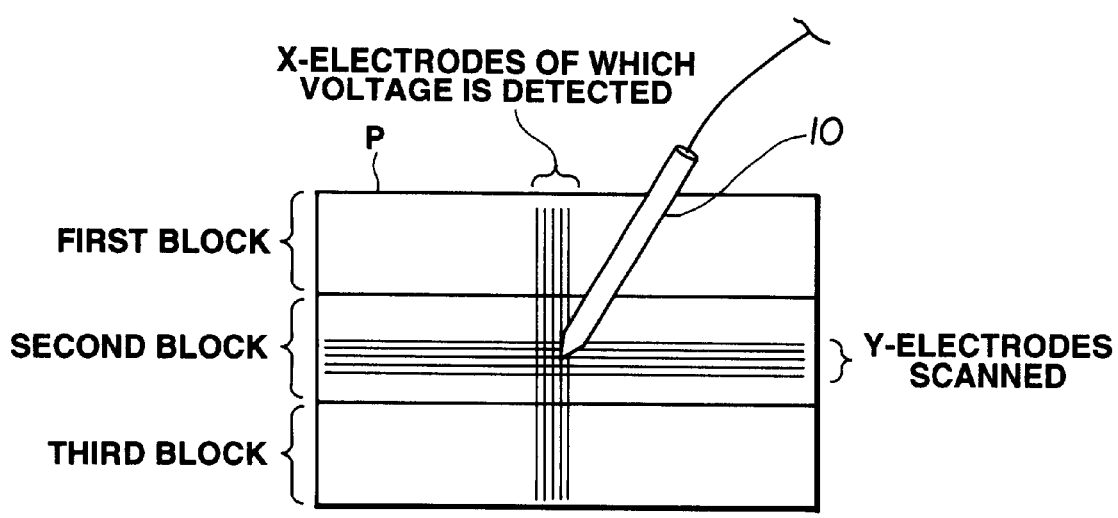
FIG. 7 is a schematic view showing a limited example of display region dividing and a detection electrode in the display-integrated tablet device of FIG. 1.

First, during the first block display device $T_{B1}$, the driver controller 3 drives the Y-scan driver 4 and X-scan driver 5 to carry out display of a first block section (display region shown in FIG. 7). At this time, a timing of driving of the Y-scan driver 4 and X-scan driver 5 for one line is as shown in FIGS. 12(g) to 12(l). Thus, the Y-scan driver 4 applies a scan voltage to the Y-electrodes $y_1$ to $y_n$ in turn to carry out vertical scanning thereof and the X-scan driver 5 is driven to apply a voltage depending on display data to the X-electrodes $x_1$ to $x_m$ within a period of time for which one Y-electrode is scanned. Alternatively. display data may be concurrently fed to the X-electrodes $x_1$ to $x_m$.

Then, at a predetermined position within the first block display period $T_{B1}$ in which display of the first block is thus carried out, a pulse output period $T_p$ during which a pulse is output from the stylus pen 10 for X-coordinate detection is set. In the period, the pen operation changing-over switch 11 is changed over to the side of the pulse generation circuit 13 as shown in FIG. 2(b), as in the pulse output period $T_p$, so that the stylus pen 11 outputs a plurality of pulses to any desired position on the tablet 1 (FIG. 6(f)). Then, a voltage value (FIG. 6(e)) of each of the second gate electrodes obtained due to electrostatic capacity coupling is input through the second gate electrode terminals G11 to G1m to the X-coordinate detection section 8 and held therein.

After the period elapses, the X-coordinate detection section 8 outputs a peak signal based on the voltage value held therein and the coordinate detection controller 9 detects the X-coordinate based on a timing of inputting of the peak signal thereto. Such operation of X-coordinate detection by the coordinate detection controller 9 is merely required to be carried out until the next pulse output period $T_p$.

Thus, in the first block display period $T_{B1}$, display scan is finally carried out with respect to the last Y-electrode (last scanning line) in the predetermined first block and a voltage for X-coordinate detection is finally held in the X-coordinate detection section 8. Then, the first Y-coordinate detection period $Ty_1$ sets in. In the period $Ty_1$, display operation is temporarily stopped, during which a scan pulse for Y-coordinate detection is output.

In the first Y-coordinate detection period $Ty_1$, first the pen operation changing-over switch 11 is changed over to the side of the Y-coordinate peak detection circuit 12 (FIG. 2(a)), to thereby permit the stylus pen 10 to input a coordinate detection signal, as in the Y-coordinate detection period shown in FIGS. 5(a) to 5(i).

Then, in the period $Ty_1$, the display controller 2 controls the driver controller 3 so as to permit a scan pulse for Y-coordinate detection to be output from the Y-scan driver 4 to the Y-electrodes as shown in FIG. 6(d).

In this instance, the scan pulse is adapted to permit only the Y-electrodes in a predetermined range to be scanned in turn, for example, about the Y-coordinate discriminated in the preceding one-image-plane display period. When the stylus pen 10 is placed at a position in the second block shown in FIG. 7 for coordinate detection, for example, in the preceding one-image-plane display period, only the Y-electrodes in a predetermined range about a position of the Y-electrode scanned in the second block are scanned. Then, a voltage obtained from each of the Y-electrodes thus scanned within the Y-coordinate detection period $Ty_1$ is fed through the stylus pen 10 to the Y-coordinate peak detection circuit 12 and then the coordinate detection controller 9 discriminates another Y-coordinate based on a peak detection signal output from the Y-coordinate peak detection circuit 12.

The reason why the illustrated embodiment permits the coordinate detection range to be limited is that under conditions that a user carries out coordinate input by means of the stylus pen 10, it is not considered that the pen point of the stylus pen is instantaneously moved from a current position to a position considerably away from the current position. Therefore, when an X-Y coordinate is discriminated, the subsequent detection of a coordinate around the coordinate thus discriminated permits detection to be satisfactorily carried out following movement of the pen point without any difficulty. Thus, the above-described scanning of only a predetermined number of Y-electrodes results in a length of time required for one Y-coordinate detection being substantially reduced as compared with scanning of all the Y-electrodes.

The above-described operation is carry out so as to limit a detection region with respect to only Y-coordinate detection. Also in X-coordinate detection, peak detection may be carried out with respect to only a voltage of each of the second gate electrodes in a predetermined range held in the X-coordinate detection circuit 8 based on the preceding coordinate detection data. Alternatively, the operation may be carried out to exhibit a switching function which permits a range of the second gate electrodes during inputting of a voltage to the X-coordinate detection circuit 8 based on the preceding coordinate detection data to be limited to a predetermined range. For example, when the stylus pen 10 is positioned as shown in FIG. 7 for coordinate detection during the preceding one-image-plane display period, peak detection is carried out with respect to only the second gate electrodes in a predetermined range about the position against which the pen point is abutted, as indicated as the X-electrodes at which a voltage is detected in FIG. 7. Such construction permits not only the Y-coordinate detection period but a length of time required for discrimination of an X-coordinate by the coordinate detection controller 9 to be reduced.

When the first Y-coordinate detection period $Ty_1$ elapses as described above, the second block display period $T_{B2}$ sets in, wherein substantially the same operation as in the first block is initiated at a first Y-electrode in a predetermined display range of the second block (or the Y-electrode next to the last Y-electrode in the first block), resulting in image display being restarted.

A pulse output period $T_p$ is likewise set in the second block display period $T_{B2}$ (FIG. 6(f)) and substantially the same operation as in the pulse output period T within the preceding first block display period $T_{B1}$ is carried out to hold a voltage for X-coordinate detection (FIG. 6(e)) obtained at each of the second gate electrodes in the X-coordinate detection circuit 8. After the period elapses, the coordinate detection controller 9 carries out discrimination of a further X-coordinate.

Then, when a last Y-electrode in the second block is scanned through the second pulse output period $T_p$, resulting in the second block display period $T_{B2}$ terminating and then the second Y-coordinate detection period $Ty_2$ sets in, only Y-electrodes in a predetermined range about the Y-coordinate detected in the preceding first Y-coordinate detection period $Ty_1$ are scanned, during which a voltage induced due to electrostatic capacity coupling is fed through the stylus pen 10, and then another Y-coordinate is detected on the basis of the voltage induced.

Further, when the second Y-coordinate detection period $Ty_2$ elapses and then the third block display period $T_{B3}$ sets in, scanning is carried out from a first Y-electrode to a last Y-electrode in the third block, resulting in display for one image plane being completed. Also, in the period, a third pulse output period $T_p$ (FIG. 6(f)) is set and substantially the same operation as in the preceding pulse output period $T_p$ is carried out to permit the coordinate detection controller 9 to discriminate another X-coordinate.

Then, when the third block display period $T_{B3}$ terminates, a third Y-coordinate detection period $Ty_3$ for Y-coordinate detection sets in. Also, in the third Y-coordinate detection period $Ty_3$, only Y-electrodes in a predetermined range about the Y-coordinate discriminated in the preceding second Y-coordinate detection period $Ty_2$ are scanned to generate a voltage, which is input in the form of a detection signal to the stylus pen 10, resulting in another Y-coordinate being detected.

Then, operation shown in FIGS. 6(a) to 6(f) is repeatedly carried out for every one-image-plane display period so long as X-Y coordinate detection can continuously take place. For example, when coordinate discrimination is rendered impossible, operation is returned to FIGS. 5(a) to 5(i). When a coordinate is detected in the operation shown in FIGS. 5(a) to 5(i), operation may be moved to quick operation shown in FIGS. 6(a) to 6(f).

In the operation described above with reference to FIGS. 6(a) to 6(f), the image plane is divided for coordinate detection (X, Y) and only electrodes in a predetermined range about the coordinate discriminated in the preceding detection operation are scanned, resulting in coordinate detection being carried out at every termination of display on each of the divided image planes. Thus, the illustrated embodiment permits detection of an X-Y coordinate position to be carried out plural times within the one-image-plane display period $T_F$. Also, it permits the display interruption period to be substantially reduced, to thereby improve luminance of an image displayed.

Thus, supposing that the one-image-plane display period $T_F$ is set to be about 1/60 second, even setting of the number of detection mode periods sufficient to realize a coordinate detection speed of 1/120 second or more required for recognition of letter or character input permits an influence of luminance or the like on an image displayed to be disregarded.

Therefore, when, for example, the stylus pen 10 is moved on the tablet 1 to input coordinates depending on characters, figures and the like, display/coordinate detection operation is permitted to be carried out at a timing of each of two patterns shown in FIGS. 5(a) to 5(i) and FIGS. 6(a) to 6(f), so that a coordinate detection speed may be increased while ensuring that luminance sufficient for an image displayed is provided.

Thus, when it is not desired to carry out coordinate inputting or coordinate discrimination is not obtained for a while during coordinate inputting, image display is carried out by operation shown in FIGS. 5(a) to 5(i), so that high luminance may be positively maintained. When an X-Y coordinate is continuously detected by operation shown in FIGS. 5(a) to 5(i), operation takes place at a timing shown in FIGS. 6(a) to 6(f) to carry out X-Y coordinate detection plural times while keeping luminance high, so that it is also possible to accommodate it to continuous character inputting.

In operation at a timing shown in FIGS. 6(a) to 6(f) in the illustrated embodiment, one image plane is divided into three block display periods, so that X-Y coordinate detection may take place three times in each one-image-plane display period $T_F$. The number of actual display periods into which the one-imageplane display period is divided or the number of times of coordinate detection may be set as desired and suitably set depending on conditions under which the device is used. Also, in operation at a timing shown in FIGS. 6(a) to 6(f), the Y-coordinate detection periods each are set after each of the block display periods. Alternatively, the former may be set before the latter.

As can be seen from the foregoing, the display-integrated tablet device of the present invention has the display (FED) including the field-emission cathode incorporated therein and so constructed that X-coordinate detection is carried out in a manner to take a voltage obtained by feeding a pulse of the stylus pen to each of the second gate electrodes for controlling an angle of emission of electrons from the emitters in the X-coordinate detection section. Such construction of the present invention permits the X-coordinate detection to be attained during the actual display period. Also, Y-coordinate detection is carried out in such a manner that a voltage obtained in a period during which X-electrode scanning is not executed is input in the form of a detection signal from the stylus pen to the tablet. Thus, it is possible to reduce a display interruption period in the one-image-plane display period, so that an actual display period may be increased to improve luminance of an image displayed.

Also, in the present invention, when X-Y coordinate detection is once executed by the above-described operation, an actual image display period in each of the subsequent one-image plane display periods is divided into a plurality of blocks. Also, a Y-coordinate detection period is provided before or after each of the block display periods, so that only Y-electrodes in a predetermined range about a Y-coordinate previously detected may take place during the Y-coordinate detection period. This permits a length of time required for each Y-coordinate detection to be reduced. Also, X-coordinate detection is carried out by obtaining an output of the stylus pen during each of the block display periods. Thus, X-Y coordinate detection can be executed plural times, resulting in coordinate detection for character recognition being accomplished with increased accuracy. Further, this likewise reduces a display interruption period, to thereby improve luminance of an image displayed.

In addition, the present invention may be so constructed that a resistor of a high resistance value is connected between each of the second gate electrodes and the second gate driver. This permits a voltage for detection induced by a pulse output from the stylus pen to be efficiently fed to the X-coordinate detection section.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A display-integrated tablet device comprising:

a tablet which includes a plurality of cathode electrodes arranged in a stripe-like manner and provided thereon with emitters for emitting electrons therefrom, a plurality of first gate electrodes arranged above said cathode electrodes in a manner to be perpendicular to said cathode electrodes, a plurality of second gate electrodes arranged on said first gate electrodes so as to extend in a direction substantially identical with said first gate electrodes, and anode electrodes each arranged in a manner to be opposite to each of said second gate electrodes and having a phosphor deposited thereon;

a Y-electrode drive means for scanning at least said cathode electrodes at a predetermined timing;

an X-electrode drive means for scanning said first gate electrodes at a predetermined timing;

a conductor for detection changed over between a first state of outputting a signal for detection for coordinate input and a second state for detecting a scan voltage;

a first peak detection means connected to said second gate electrode for detecting a peak of said signal for detection output from said conductor for detection in said first state;

a second peak detection means for detecting a peak value of said scan voltage output from said conductor for detection in said second state; and an X-Y coordinate detection means for detecting an X-coordinate and a Y-coordinate of said conductor for detection abutted against said tablet from said first and second peak detection means.

2. A display-integrated tablet device as defined in claim 1, wherein in said second state, said conductor for detection is set so as to detect a scan voltage within a predetermined range about a position on the Y-coordinate when at least the Y-coordinate is detected after display of one image plane.

3. A display-integrated tablet device as defined in claim 1 or 2, wherein said tablet includes a display plane which is divided into at least two display regions in a direction of said Y-electrodes;

said conductor for detection being controlled so as to be changed over to said second state when display on each of said display regions is terminated.

4. A display-integrated tablet as defined in claim 1, wherein said second gate electrodes are fed with a driving voltage through a resistor of a high resistance value.

5. A display-integrated tablet as defined in claim 2, wherein said second gate electrodes are fed with a driving voltage through a resistor of a high resistance value.

6. A display-integrated tablet as defined in claim 3, wherein said second gate electrodes are fed with a driving voltage through a resistor of a high resistance value.

* * * * *